H. SNYDER.
SAW-MILL DOGS.

No. 192,795. Patented July 3, 1877.

Witnesses:
Lloyd Norris
Jno. D. Patton

Henry Snyder
Inventor:
by Johnson & Johnson
Att'ys.

UNITED STATES PATENT OFFICE.

HENRY SNYDER, OF FOWLERSVILLE, MICHIGAN.

IMPROVEMENT IN SAW-MILL DOGS.

Specification forming part of Letters Patent No. 192,795, dated July 3, 1877; application filed May 8, 1877.

*To all whom it may concern:*

Be it known that I, HENRY SNYDER, of Fowlersville, in the county of Livingston and State of Michigan, have invented certain new and useful Improvements in Saw-Mill Dogs, which improvements are fully set forth in the following specification and accompanying drawings, in which—

Figure 1:
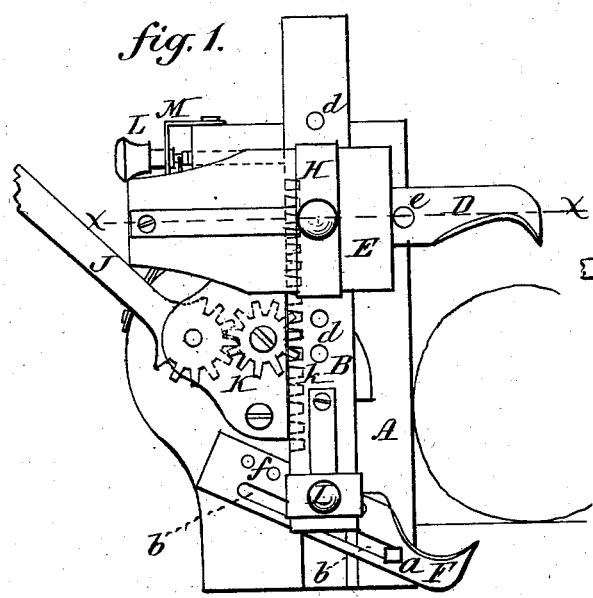
Figure 3:
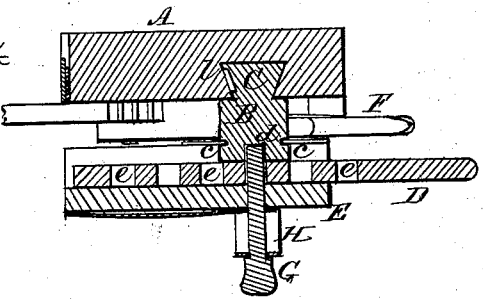
Figure 2:
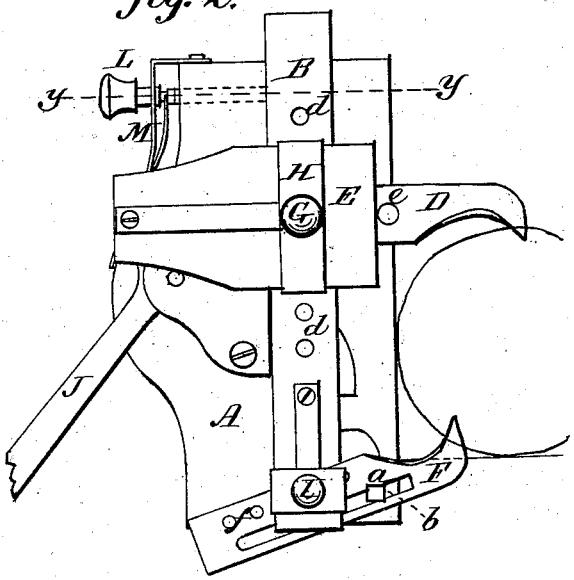
Figure 4:
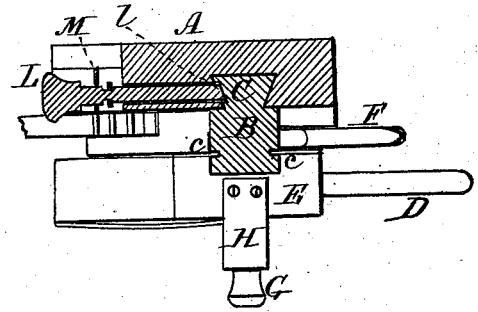

Figure 1 represents an elevation of the device as adjusted to receive the log upon the head-block; Fig. 2, a similar view, the dogs being in positions to secure the log firmly to the head-block; Fig. 3, a horizontal section taken at the line *x x* of Fig. 1; and Fig. 4, a similar section taken at the line *y y* of Fig. 2.

The device has two dogs adapted to hold the upper and the lower part of the log upon the head-block, the object being to hold the lower portion of the log from slipping away from the head-block, which is found to be a great difficulty in saw-mills, especially in sawing crooked logs the bottom is liable to slip, and to bind and injure or break the saw, causing delay, and requiring the log to be readjusted and secured.

In my improved construction the lower dog is made adjustable, to suit different size logs, and to adapt it more readily to crooked logs; but more particularly this capacity for adjustment is to cause the lower dog to serve as a means for preventing the log from being forced down too hard on the head-block, whether said dog is adjusted for a large or small log, and thereby allow the head-block to be moved easier. In whatever position the lower dog is adjusted it will produce this result, without regard to the size of the log; and such adjustment is found to be of special advantage in connection with the horizontal adjustment of the upper dog, so that both dogs can be set in or out, as may be required for different size and shaped logs.

A head-piece, A, firmly bolted to the head-block, serves to support a center-bar, B, which carries the dogs. This center-bar is secured to the head-piece by a dovetail connection, C, which allows said bar to have a vertical movement upon the fixed head-piece to operate the dogs, the upper one D of which is secured in a slide, E, and the lower one F is pivoted to both the center-bar and the head-piece, the fixed pivot-pin *a* of which passes through a long slot, *b*, in said lower dog, to allow it to be lengthened or shortened, and to operate in a manner to be presently described. The slide E is recessed to fit over the center-bar B, and is secured thereto by tongues *c c*, fitting into grooves in the sides of said bar, so as to allow it to be moved up and down thereon.

The upper dog D is fitted in said slide so as to be lengthened or shortened, and it is secured by a spring-bolt, G, fitted in a holder, H, and, passing through both the slide E and the dog D, enters holes *d* in the center-bar, thereby securing the slide vertically and the dog horizontally, the latter having a series of holes, *e*, by which it may be set in or out.

The lower dog F, as stated, is pivoted in a slot, *b*, to the head-piece. It is also pivoted, by a spring bolt, I, to the center-bar, within a slot in which the said dog is pivoted, and may be adjusted in or out by holes *f*, as may be required to suit different size and shapes of logs.

By means of the long slot *b* the dog may be adjusted in or out by changing the spring-bolt I in the holes in said dog. This adjustment gives the advantage of causing the dog to take hold of different sized logs without raising them from the head-block, as the effect of the pivot-pin *a* is to cause the point to be raised a uniform distance, whether the dog be set in or out. For crooked logs the dog may be set in or out, and always act with the same amount of upward force upon the log, yet not lifting it from the head-block. By this means both dogs have a horizontal adjustment to suit the size and shape of the log, and both dogs have a vertical adjustment to enter and hold the log so that it cannot slip or turn at the lower side.

The descent of the center-bar brings down the upper dog and elevates the claw of the lower dog.

To open the dogs the center-bar is raised. A cogged lever, J, pivoted to the head-piece, works into a pinion, K, which engages with a cogged bar or rack, *k*, on the side of the center-bar B, serves as the means for raising and lowering the center-bar, and operating both dogs at one movement of the lever. A spring-bolt, L, passes through the head-piece at or near its top, and takes into notches $l$ in the center-bar to keep the latter from raising when the dogs are in position in the log. A hold-plate, M, serves to hold the spring-bolt L out of the rack when operating the center-bar.

To place the dogs in position to receive the log the center-bar is raised, which turns the claw of the lower dog down below the top or surface of the head-block. The slide E is then raised and secured in the top hole in said bar. The log is then rolled in place, and the upper dog brought down with its claw upon the log. The center-bar is then forced down hard by depressing the lever, and both dogs are put into the log, holding the bottom securely and firmly to the head-block, and keeping the upper dog from bearing down too hard thereon.

The outer end of the spring-bolt L is square, and passes through a corresponding opening in the hold-plate M, so that by drawing out the bolt and turning it a little a shoulder on it will catch outside of the plate M and hold the bolt out when moving the dog-carrying center-piece.

I claim—

1. The combination, with the center-bar B and the upper dog D, of the lower dog F, adjustable in and out by means of the slot $b$ and pivot-pin $a$, for the purpose set forth.

2. The lower dog provided with the slot $b$ for the pivot-pin $a$, and the holes $f$, and arranged in a guideway in the center or dog bar, in combination with the spring-bolt I, adapted to hold said dog when adjusted horizontally by means of said slot, as described.

3. The dovetail center-bar, having the toothed rack $l$, and the head-piece having the spring-bolt L, the hold-plate M, and the lever-gear connection with said center-bar, combined for operation as described.

In testimony whereof I have hereunto set my hand in the presence of two witnesses.

HENRY SNYDER.

Witnesses:
 JOHN G. GOULD,
 BENTLEY SABIN.